Patented May 30, 1939

2,160,343

UNITED STATES PATENT OFFICE 2,160,343

SULPHURIC ACID DERIVATIVES OF POLYISOBUTYLENE

John Ross, New York, N. Y., assignor to Colgate-Palmolive-Peet Company, Jersey City, N. J., a corporation of Delaware No Drawing. Application July 21, 1937,
Serial No. 154,933

9 Claims. (Cl. 260—460)

The present invention is directed to the preparation of new and unusual detergents and wetting agents, and more particularly directed to the preparation of detergents and wetting agents from isobutylene polymers by treatment with sulphur trioxide and/or its acid derivatives.

It has been the general and accepted practice in the preparation of detergents and wetting agents to use aliphatic compounds having long, straight carbon chains with the hydrophillic groups on one end of the chain. This is true of the common soaps such as sodium stearate and sodium palmitate; the sulphated long chain alcohols, for example, sodium lauryl sulphate; and the alkyl hydroxy sulphonates such as those disclosed in U. S. Patent 2,061,617 dated November 24, 1936.

According to the present invention it is now possible to prepare remarkably efficient wetting and foaming agents from branch chain olefines produced by polymerization of isobutylene, in which the olefinic linkage is not usually on the first carbon atom of the chain, by reacting them with sulphur trioxide or its acid derivatives.

By careful control of the reaction conditions and selection of the sulphur trioxide derivative it is possible to produce either the sulphate or hydroxy sulphonate of the iso-olefine.

In preparing the sulphate of the isobutylene polymers, approximately equal parts by weight of the polymer and acetic anhydride are mixed. A weight of sulphuric acid (100%) between one and two times that of the polymer is then slowly added with constant agitation to this mixture. The reaction, which is usually maintained at a temperature between about —20° C. and +20° C. by external cooling, is complete after about one to two hours stirring. The mixture is poured into ice water and the polyisobutane acid sulphate extracted from the water with butyl alcohol. The alcohol solution is neutralized with an alkaline material, the water layer containing an acetate salt separated and the alcohol removed from the polyisobutane sulphate salt by distillation under reduced pressure. The alkali metal, ammonia, amine and calcium salts can be prepared by varying the alkaline neutralizing agent used.

Other common sulphating agents such as the alkyl sulphates can be used in place of the concentrated sulphuric acid.

If the polyisobutane hydroxy sulphonate is desired, the polyisobutylene is reacted with a strong sulphonating agent such as oleum, sulphur trioxide and chlorsulphonic acid. The reaction is usually conducted in the presence of a diluent which is stable to the sulphonating agent. Suitable solvents for the purpose are liquid sulphur dioxide, low boiling chlorinated hydrocarbons, ethyl ether and petroleum ether. When using liquid sulphur dioxide, which is the preferable solvent for this purpose, the reaction is conducted at a low temperature (—10° C. or lower) and/or at increased pressure. The polyisobutylene may or may not be dissolved in the solvent depending on the type of sulphonating agent used and on the solvent employed. Preferably the polyisobutylene is added to a liquid sulphur dioxide solution of sulphur trioxide.

The quantity of sulphur trioxide or oleum should be equivalent to one mole of sulphur trioxide ($S_2O_6$) for each mole of polyisobutylene. Chlorsulphonic acid in the ratio of one mole of chlorsulphonic acid to one mole of polyisobutylene may also be used. During the mixing of the polyisobutylene and the sulphonating agent and during the following reaction period the mixture is constantly agitated. When operating under pressure, at no time should the temperature of the mixture rise above 10° C. The reaction is complete in about one to two hours and the product is an alkyl substituted carbyl sulphate.

The sulphur dioxide is removed from the reaction product as a vapor by increasing the temperature and releasing the pressure. The sulphur dioxide free material is slowly added to about three times its volume of ice water, keeping the temperature below 20° C. The oily layer is removed and the water layer is boiled for about fifteen minutes to an hour to convert the carbyl sulphate to a hydroxy sulphonic acid. The polyisobutylene hydroxy sulphonic acid may then be neutralized with caustic alkali, ammonia, amines or lime to form the corresponding salts. The product may be purified by extraction with a suitable solvent.

If an oleum which contains only a slight excess of sulphur trioxide is used, a mixture of the polyisobutane sulphates and polyisobutane sulphonates will be formed.

The following examples clearly show the two types of compounds which can be obtained from this process of treating the tetramers of isobutylene with sulphur trioxide and/or its acid derivatives.

*Example I.—Tetraisobutane sodium sulphate*

To a well-stirred mixture of 20 parts of tetraisobutylene and 20 parts of acetic anhydride, 30 parts of sulphuric acid monohydrate (100% sulphuric acid) were added slowly with constant agitation. After the addition of the iso-olefine, the reaction was allowed to continue for one hour, meanwhile continuing the stirring. At no time did the temperature rise above 0° C. during the mixing or subsequent reaction period. The whole mass at the completion of the reaction was slowly poured into ice water. This water solution was extracted with butyl alcohol to remove the sulphated tetraisobutane therefrom.

The butyl alcohol solution of the acid sulphate of tetraisobutane is neutralized with sodium bicarbonate, the water layer containing sodium acetate separated and the alcohol removed from the sodium sulphate of tetraisobutane by distillation under reduced pressure. Thirty grams of sodium tetraisobutane sulphate were obtained.

A concentrated (20%) solution of the product is faintly yellow and of perfect clarity.

*Example II.—Hydroxy tetraisobutane sodium sulphonate*

To a well-stirred solution of 30 parts of sulphur trioxide in 100 parts of liquid sulphur dioxide, 35 parts of tetraisobutylene were slowly added over a period of one hour. The reacting materials were kept at −10° C. After completion of the reaction the sulphur dioxide was removed by an increase of the temperature. The thick, oily residue was poured into ice water, the solution was raised to the boiling point, boiled one-half hour and then neutralized with caustic soda. The unreacted tetraisobutylene was separated from the water layer and the water was distilled off from the mixture of hydroxy tetraisobutane sodium sulphonate and sodium sulphate. The dried mixture of salts was extracted with butyl alcohol to remove the active ingredient. The butyl alcohol was removed by distillation leaving approximately 20 parts of pure hydroxy tetraisobutane sodium sulphonate.

The tetraisobutylene used in these examples is a mixture of isomeric olefinic hydrocarbons of empirical formula $C_{16}H_{32}$ which are produced by polymerization of isobutylene. These tetraisobutylene hydrocarbons are highly branched and the olefinic bond is believed to be placed toward the center of the longest chain in the compounds making up the major proportion of the mixture.

The following comparison of straight carbon chain alkyl sulphates and hydroxy sulphonates with the branched chain alkyl sulphates and hydroxy sulphonates produced as described above shows the remarkable and unexpected improvement in the wetting power and foaming properties of solutions of the latter type compounds.

| Wetting agent | Foam (1% sol.) | Wetting time (1% sol.) |
|---|---|---|
| Cetene hydroxy sodium sulphonate (sodium salt of hydroxy cetane sulphonic acid) | cc. 500 | Seconds 11 |
| Tetraisobutane hydroxy sodium sulphonate (sodium salt of hydroxy tetraisobutane sulphonic acid) | 500 | 1 |
| Cetene sodium sulphate (sodium salt of cetane sulphuric acid) | 550 | 9 |
| Tetraisobutane sodium sulphate (sodium salt of tetraisobutane sulphuric acid) | 600 | 1 |

The foaming test was conducted by placing 50 cc. of a 1% solution of the material in a 600 cc. stoppered graduated cylinder at room temperature and shaking the container 20 times in a vertical plane. The volume of the foam was read after allowing the container to stand two minutes.

The wetting test was conducted by comparing the time required by the various 1% solutions to wet a one inch square of unused canvas drill. By placing 100 cc. of the solution to be tested in a beaker, the time required to wet the square of cloth dropped upon the surface of the solution can be readily measured with a stop watch. In most cases, the cloth will sink to the bottom as soon as it is thoroughly wet.

While the above specific description has been directed to the use of the tetramers of isobutylene, it is possible to use other degrees of polymerization of the isobutylene. The preferred polymers are, however, the tetramers and pentamers.

The present invention is not to be restricted to any specific proportions or manner of procedure beyond the limitations of the appended claims.

I claim:

1. The process of preparing aliphatic sulphoxy acids and salts which comprises reacting a polyisobutylene of the group consisting of tetraisobutylene and pentaisobutylene with an agent of the group consisting of sulphur trioxide and the acid derivatives thereof.

2. The process of preparing aliphatic sulphoxy acids and salts which comprises reacting pentaisobutylene with an agent of the group consisting of sulphur trioxide and the acid derivatives thereof.

3. The process of preparing sulphoxy acids and salts of tetraisobutylene which comprises treating tetraisobutylene with an agent of the group consisting of sulphur trioxide and the acid derivatives thereof.

4. The process of sulphonating tetraisobutylene which comprises adding tetraisobutylene to a liquid sulphur dioxide solution of sulphur trioxide, diluting the reaction mass with water and boiling the water solution thereof.

5. The process of sulphating tetraisobutylene which comprises treating tetraisobutylene with sulphuric acid of a strength not greater than 100% to form tetraisobutane sulphate.

6. A mixture of tetraisobutane sulphates and tetraisobutane hydroxy sulphonates.

7. Tetraisobutane sulphates.

8. Tetraisobutane hydroxy sulphonates.

9. Pentaisobutane hydroxy sulphonates.

JOHN ROSS.